(12) United States Patent
Tulsky et al.

(10) Patent No.: US 9,937,560 B2
(45) Date of Patent: Apr. 10, 2018

(54) METHODS FOR PREPARATION OF NANOCRYSTALS USING A WEAK ELECTRON TRANSFER AGENT AND MISMATCHED SHELL PRECURSORS

(75) Inventors: Eric Tulsky, Berkeley, CA (US); Joseph Bartel, Eugene, OR (US); Joseph Treadway, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 617 days.

(21) Appl. No.: 13/122,117

(22) PCT Filed: Oct. 2, 2009

(86) PCT No.: PCT/US2009/059452
§ 371 (c)(1),
(2), (4) Date: Sep. 9, 2011

(87) PCT Pub. No.: WO2010/040109
PCT Pub. Date: Apr. 8, 2010

(65) Prior Publication Data
US 2011/0315927 A1    Dec. 29, 2011

Related U.S. Application Data

(60) Provisional application No. 61/102,613, filed on Oct. 3, 2008.

(51) Int. Cl.
*B05D 7/00* (2006.01)
*B22F 9/24* (2006.01)
(Continued)

(52) U.S. Cl.
CPC ............... *B22F 9/24* (2013.01); *B82Y 30/00* (2013.01); *C01B 17/20* (2013.01); *C01B 19/007* (2013.01);
(Continued)

(58) Field of Classification Search
CPC .......................................................... B22F 9/24
(Continued)

(56) References Cited

U.S. PATENT DOCUMENTS 6,207,299 B1    3/2001    Krauth
6,322,901 B1    11/2001   Bawendi et al.
(Continued)

FOREIGN PATENT DOCUMENTS

CN        1610062 A        4/2005
EP        1762642          3/2007
(Continued)

OTHER PUBLICATIONS

Reiss, ZnSe based colloidal nanocrystals: synthesis, shape control, core/shell, alloy and doped systems, New Journal of Chemistry, 2007, 31, p. 1843-1852.*
(Continued)

*Primary Examiner* — Tabitha Penny

(57) ABSTRACT

Methods for preparing core/shell nanocrystals are provided, using mismatched shell precursors and an electron transfer agent to control the nucleation and growth phases of particle formation. One method includes forming a reaction mixture comprising a plurality of nanocrystals, a first shell precursor, a second shell precursor, a weak electron transfer agent, and optionally a solvent, wherein, the first shell precursor and the second shell precursor have different oxidation states; and heating the reaction mixture to a temperature high enough to induce formation of the shell on each of the plurality of nanocrystals.

18 Claims, 2 Drawing Sheets

(51) Int. Cl.
  *B82Y 30/00* (2011.01)
  *C01B 17/20* (2006.01)
  *C01B 19/00* (2006.01)

(52) U.S. Cl.
  CPC ...... *C01P 2004/62* (2013.01); *C01P 2004/64* (2013.01); *C01P 2004/84* (2013.01)

(58) Field of Classification Search
  USPC ........................................................ 427/212
  See application file for complete search history.

(56) References Cited

U.S. PATENT DOCUMENTS

| | | | |
|---|---|---|---|
| 6,649,138 B2 | 11/2003 | Adams et al. | |
| 6,815,064 B2 | 11/2004 | Treadway et al. | |
| 6,955,855 B2 | 10/2005 | Naasani | |
| 7,147,712 B2 | 12/2006 | Zehnder et al. | |
| 7,193,098 B1* | 3/2007 | Lucey et al. | 556/1 |
| 7,198,847 B2 | 4/2007 | Naasani | |
| 2003/0097976 A1* | 5/2003 | Zehnder et al. | 117/68 |
| 2005/0129947 A1* | 6/2005 | Peng et al. | 428/403 |
| 2005/0214536 A1 | 9/2005 | Schrier et al. | |
| 2008/0075957 A1 | 3/2008 | Kim et al. | |

FOREIGN PATENT DOCUMENTS

| | | |
|---|---|---|
| WO | WO-2003/086660 | 10/2003 |
| WO | WO 2004/06636 | 8/2004 |
| WO | WO-2010/040109 A2 | 4/2010 |

OTHER PUBLICATIONS

Ku, The effect of weak chelating agnets on the removal of heavy metals by precipitation processes, Environmental Progress and Sustainalbe Energy, vol. 5 Issue 3, Aug. 1986, p. 147-153.*

Carion, Synthesis, encapsulation, purification and coupling of single quantum dots in phospholipid micelles for their use in cellular and in vivo imaging, Nature Protocols, vol. 2 No. 10, 2007, p. 2383-2390.*

Murray, C., et al. "Synthesis and Characterization of Nearly Monodisperse CdE (E = S, Se, Te) Semiconductor Nanocrystallites", *J. Am. Chem. Soc.*, 1993,115 (19), pp. 8706-8715.

International Preliminary Report on Patentability for PCT Application No. PCT/US2009/059452 dated Apr. 14, 2011.

International Search Report and Written Opinion for PCT Application No. PCT/US2009/059452 dated Apr. 29, 2010.

Peng, Z., et al. "Formation of High-Quality CdTe, CdSe, and CdS Nanocrystals Using CdO as Precursor", *Journal of the American Chemical Society*, 2001, 123 (1), pp. 183-184.

Qu, L., et al. "Alternative Routes Toward High Quality CdSe Nanocrystals", *Nano Letters*, 2001, 1 (6), pp. 333-337.

Stankova, I., et al. "Synthesis of thiazole, imidazole and oxazole containing amino acids for peptide backbone modification", *J. Peptide Sci.*, 1999, 5 (9), pp. 392-398.

EPO, "European Search Report", dated Aug. 7, 2013, pp. 1-6.

* cited by examiner

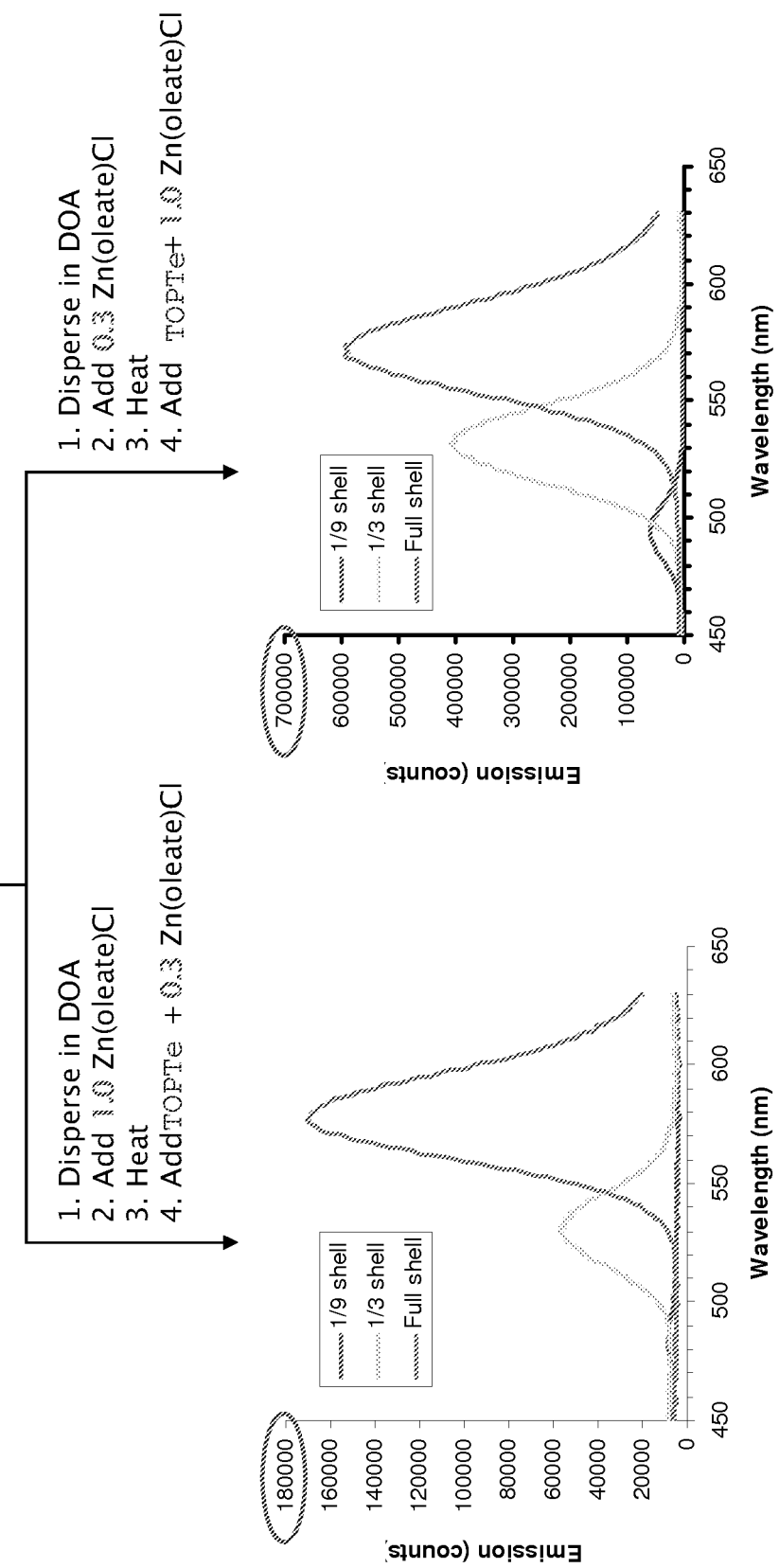

METHODS FOR PREPARATION OF NANOCRYSTALS USING A WEAK ELECTRON TRANSFER AGENT AND MISMATCHED SHELL PRECURSORS

CROSS REFERENCE TO RELATED APPLICATIONS

This application is a national stage filing of International Application No. PCT/US2009/059452, filed Oct. 2, 2009, which claims priority to U.S. Provisional Application No. 61/102,613, filed Oct. 3, 2008; which disclosures are hereby incorporated by reference in their entirety.

STATEMENT OF RIGHTS TO INVENTIONS MADE UNDER FEDERALLY SPONSORED RESEARCH

This embodiments disclosed herein were made, in part, with government support under cooperative agreement No. 70NANB4H3053 with the National Institute of Standards and Technology and the U.S. Department of Commerce. The government may have certain rights in the disclosed embodiments.

TECHNICAL FIELD

This disclosure relates to methods for making and using semiconductor core nanocrystals. More particularly, the disclosure provides methods for adding a shell layer to a nanocrystal.

BACKGROUND

Nanocrystals of semiconductor material typically size in range from about 1 to about 100 nanometers in diameter and have unique optical properties not found in the bulk materials. One particularly important property of such nanocrystals is the dependence of the emission wavelength on the size of the particle.

A number of methods for the formation of core nanocrystals from metal-anion binary salts are known in the art. These methods can generally be divided into classes based on the type of reactants employed and the presumed mechanism that arises based on how the oxidation states of the reactants compare. In the first approach, the metal and nonmetal components that are reacting with each other are both provided in their neutral atomic form. For example, Murray, et al., *J. Am. Chem. Soc.*, 1993, 115: 8706, described the reaction of dimethylcadmium ($Me_2Cd$) and trioctylphosphine selenide (TOPSe), which release neutral cadmium ($Cd^0$) and selenium ($Se^0$) atoms in solution respectively, so that no electron transfer is required to make their oxidation states match. Because the reactants are in suitable form to react with each other, this situation is considered a 'match' of oxidation states: neither needs to be oxidized or reduced for a reaction to occur, and no net electron imbalance results. Such reactions generally proceed very rapidly, because the cadmium and selenium atoms react instantly upon collision to form cadmium selenide (CdSe). In a second category, the metal and nonmetal components are both provided in their ionic forms. For example, Peng, et al., *J Am. Chem. Soc.*, 2001, 123:183, described the preparation of CdSe and cadmium telluride (CdTe) using cadmium oxide (CdO) as the cadmium ion source, in the presence of TOPO and a phosphonic acid ligand, such as hexylphoshonic acid (HPA), octylphosphonic acid (OPA) or tetradecylphosphonic acid (TDPA). Cadmium salts release $Cd^{2+}$ ions in solution, while non-metal precursors such as bis(trimethylsilyl)sulfide ($TMS_2S$) release $S^{2-}$, in solution. These reactions also proceed very rapidly, since the cadmium and sulfur ions can also react instantly to form cadmium sulfide (CdS). This reaction type is also considered a 'match', because again no oxidation or reduction of either species is required, and they can react in an appropriate stoichiometry to produce a neutral product.

In each of these categories, the extreme reactivity of the intermediates toward each other makes it difficult to control the particle size, particle yield and particle size dispersity. The reacting species, once released in solution, will react at a diffusion-controlled rate, or very nearly that fast. In some instances, the use of ligands or solvents may slow the reaction somewhat, but these approaches have not provided a general approach to controlling particle formation. Because the reactions tend to be so fast, they can be difficult to control. In particular, for example, it is often impossible to prevent such reactions from starting new nanocrystals (referred to as nucleation), which can make it difficult to control a reaction that is intended to add a shell to an existing nanocrystal. It is typically necessary to form a semiconductor shell on a nanocrystal for use in applications of interest, since the shell greatly enhances the chemical and photo-stability of the nanocrystal core. The shell is usually made of a different and complementary semiconductor material from the underlying core nanocrystal; thus if the shell-forming reaction results in nucleation, it forms new nanocrystals with a different composition from what is desired mixed in with the desired ones, and it is extremely difficult to separate the nanocrystals once they are formed as a mixture.

In a third approach, mismatched precursors may be chosen such that one precursor provides a neutral atom in solution under the reaction conditions, while the other precursor provides an ionic atom. For example, a mixture of cadmium alkylphosphonate, which is a source of $Cd^{2+}$ ions, and trioctylphosphine selenide (TOPSe), which is a source of $Se^0$, might be employed to provide mismatched precursor atoms. Such precursors cannot react to form a neutral species unless an electron transfer agent is present to adjust the oxidation state of one of the reactive species to provide 'matched' species capable of undergoing reaction. For example, a reductant could be used to add electrons to $Cd^{2+}$ to provide two non-ionic species (i.e., $Cd^0$ and $Se^0$), or it could add electrons to $Se^0$ to provide two ionic species (i.e., $Cd^{2+}$ and $Se^{2-}$). Either way, once the atomic species are 'matched', their reaction can proceed, but the reaction cannot proceed without such an electron transfer agent. Alternatively, two ionic species having the same charge (i.e., two cations or two anions) would also be 'mismatched.' For example, mismatched precursors that provide two cationic species could be used, where one species is reduced to provide an anionic species capable of undergoing a 'matched' reaction. For example, $Se^{2+}$ or $Se^{4+}$ could be reduced to provide selenide anion $Se^{2-}$, which could undergo reaction with a metal cation species, such as $Cd^{2+}$. In another example, two cationic species could both be reduced to neutral species.

In another example, an oxidant could be used as the electron transfer agent, in a reaction between a neutral species and an anionic species. For example, $Cd^0$ and $Se^{-2}$ could be used as mismatched precursors, wherein an oxidant is used to oxidize $Se^{-2}$ to $Se^0$, giving two neutral species capable of undergoing a 'matched' reaction. The need for this electron transfer process and agent has been largely overlooked: because of the small scale and the complexity of the reactions involved, the role of the electron transfer agent is often performed by serendipitous impurities either present in starting materials or accidentally generated in situ. Some reactions having added electron transfer agents have been reported: for example, Zehnder and Treadway (U.S. Pat. No. 7,147,712) described the use of a promoter, which could be oxygen or a reducing agent, to promote and control nucleation and accelerate crystal growth. A single reductant was added to initiate nucleation (initial formation) and facilitate growth of the quantum dots once nucleation had occurred. This approach provided control over the particle yield and over the ultimate particle size. However, because the same reductant was used for both the nucleation and growth phases, separation of the two phases could be achieved only by indirect means.

There remains a need in the art for improved methods for manufacturing nanocrystal products in a high product yield and with a high level of control over particle size and particle dispersity, and also a need for separately controlling the nucleation and growth phases of nanocrystals.

SUMMARY

Provided herein are methods to control and promote nanocrystal growth under conditions that avoid or minimize nucleation, thus it provides improved methods for forming a shell layer of a semiconductor material on an existing nanocrystal. An unexpected advantage of the improved methods was observation that the rate of addition of the second shell forming precursor does not affect shell formation, while prior art methods typically require a slow and controlled addition of the precursors in order to avoid undesired nucleation of the shell precursors.

The embodiments disclosed herein provide improved methods for producing core/shell nanocrystals in higher purity and quality relative to previous methods. The methods are used to apply a shell of semiconductor material to an existing nanocrystal, under conditions where the shell-forming materials are largely or entirely unable to form new nanocrystals. Typically, the shell is made of a different semiconductor material from that of the existing nanocrystal, so it is important to avoid forming new nanocrystal nuclei in the shell-forming step, which is complicated by the fact that the shell-forming conditions are very similar to conditions used to form new nanocrystals. The shell-forming processes often use the same solvents, precursors and similar temperatures to those used for making nanocrystals. New nanocrystals formed in a shell-forming reaction would contaminate the desired product, core/shell nanocrystals, and would be extremely difficult to remove from the desired product. Thus a method to form a shell on an existing core without forming undesired new cores from the shell-forming material is highly useful. The core/shell nanocrystal products are thus cleaner than nanoparticle products made by prior methods, which typically contain nanoparticles of undesired composition that result from nucleation occurring when only shell growth was intended. Also, the new methods make the reaction more robust and reliable: because the shell formation is controlled by the weak reductant, it is not necessary to carefully meter in the shell precursors as was often done in known methods as a means to avoid nucleation during shell formation. Thus in many embodiments, one or more of the shell precursors can be added in one portion, as quickly as desired without causing too much cooling of the reaction mixture; slow addition of a precursor to prevent undesired formation of new nuclei is not necessary.

In one aspect, provided herein is a method of producing a shell on a nanocrystal, the method comprising: forming a reaction mixture comprising a plurality of nanocrystals, a first shell precursor, a second shell precursor, a weak electron transfer agent, and optionally a solvent, wherein, the first shell precursor and the second shell precursor have different oxidation states; changing the oxidation state of the first shell precursor or the second shell precursor using the weak electron transfer agent such that the first shell precursor and the second shell precursor can react to form a shell around each of the plurality of nanocrystals; and heating the reaction mixture to a temperature high enough to induce formation of the shell on each of the plurality of nanocrystals.

In another aspect, provided herein is a method for preparing a core/shell nanocrystal, comprising: providing a mixture comprising a first shell precursor, a second shell precursor, a weak electron transfer agent, and optionally a solvent; providing a primary nanocrystal; and contacting the primary nanocrystal with the mixture, whereby a shell is formed on the primary nanocrystal without formation of nanoparticles produced from the first shell precursor and the second shell precursor.

In still another aspect, provided herein is A method for preparing a core/shell nanocrystal with increased brightness, comprising: pre-treating a nanocrystal core by, forming a reaction mixture containing the nanocrystal core, a solvent, and a first portion of a first shell precursor, and heating the reaction mixture to a first temperature; adding a second shell precursor and a remaining portion of the first shell precursor to the reaction mixture; and heating the reaction mixture to a second temperature that is high enough to induce formation of a shell on the nanocrystal core, wherein the resulting core/shell nanocrystal is greater than about 10% brighter than a core/shell nanocrystal formed without the pre-treatment.

These and other features, aspects, and embodiments are described below in the section entitled "Detailed Description."

BRIEF DESCRIPTION OF THE DRAWINGS

FIG. 2 shows how pre-treating the primary nanocrystal with a metal salt as a first shell precursor, prior to addition of the second shell precursor, can improve nanocrystal product brightness: note the intensity scale differs between the two graphs, and the particles are much brighter in the graph on the right side. The high peak on the right side of the graph represents the full shell, the intermediate peak represents the ⅓ shell, and the low peak at the left side of the graph represent the ⅑ shell.

DETAILED DESCRIPTION

Figure 1:
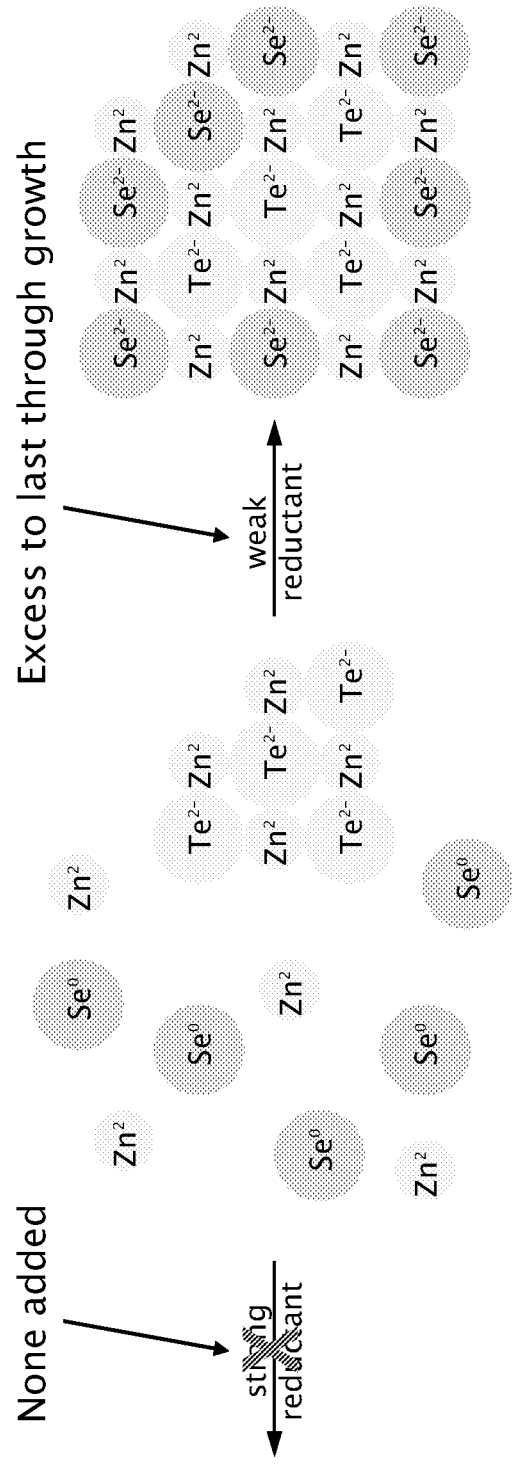
FIG. 1 shows nanocrystal shell formation under conditions of the embodiments disclosed herein, where an excess of a weak reductant is present to promote growth of a shell from mismatched precursors, while no strong reductant is present to promote formation of new nuclei from the shell precursors

The embodiments disclosed herein may be understood more readily by reference to the following detailed description of the preferred embodiments and the Examples included herein. It is to be understood that the terminology used herein is for the purpose of describing specific embodiments only and is not intended to be limiting.

Unless defined otherwise, all technical and scientific terms used herein have the same meaning as is commonly understood by one of ordinary skill in the art to which the embodiments disclosed herein belongs.

As used herein, "a" or "an" means "at least one" or "one or more."

As used herein, "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

"Nanoparticle" as used herein refers to any particle with at least one major dimension in the nanosize range. Typically, a nanoparticle has at least one major dimension ranging from about 1 to 1000 nm.

Examples of nanoparticles include a nanocrystal, such as a core/shell nanocrystal, plus any associated organic coating or other material that can be on the surface of the nanocrystal. A nanoparticle can also include a bare core/shell nanocrystal, as well as a core nanocrystal or a core/shell nanocrystal having a layer of, e.g., TDPA, OPA, TOP, TOPO or other material that is not removed from the surface by ordinary solvation. A nanoparticle can have a layer of ligands on its surface which can further be cross-linked; and a nanoparticle can have other or additional surface coatings that can modify the properties of the particle, for example, increasing or decreasing solubility in water or other solvents. Such layers on the surface are included in the term 'nanoparticle.'

"Nanocrystal" as used herein can refer to a nanoparticle made out of an inorganic substance that typically has an ordered crystalline structure. It can refer to a nanocrystal having a crystalline core (core nanocrystal), or to a core/shell nanocrystal. Typically, a nanocrystal has a core diameter ranging from 1-100 nm, preferably between about 1 to 50 nm A core nanocrystal is a nanocrystal to which no shell has been applied; typically it is a semiconductor nanocrystal. It can have a homogenous composition can or its composition can vary with depth inside the nanocrystal. Many types of nanocrystals are known, and methods for making a core nanocrystal and applying a shell to it are known in the art. The improved shell-forming methods described herein are applicable for producing a shell on core nanocrystals. To distinguish a nanocrystal used in the embodiments disclosed herein from one that might be formed unintentionally in a shell-forming step, the nanocrystal introduced into a reaction mixture is referred to as a primary nanocrystal, regardless of whether it is a core nanocrystal or a core/shell nanocrystal. In either event, the methods disclosed herein produce a new shell on the outer surface of the primary nanocrystal.

The primary nanocrystals used for embodiments disclosed herein are generally bright fluorescent nanocrystals, and the nanoparticles prepared from them are typically also bright, e.g., having a quantum yield of at least about 10%, sometimes at least 20%, sometimes at least 30%, sometimes at least 40%, and sometimes at least 50% or greater. It can be advantageous for nanocrystals to have a surface layer of ligands to protect them from degradation in use or during storage; thus isolated nanocrystals made by the present methods can have a surface layer of ligands on the outside of the shell of the nanocrystal.

"Quantum dot" as used herein typically refers to a nanocrystalline particle made from a material that in the bulk is a semiconductor or insulating material, which has a tunable photophysical property in the near ultraviolet (UV) to far infrared (IR) range.

"Water-soluble" is used herein to mean the item can be soluble or suspendable in an aqueous-based solution, such as in water or water-based solutions or buffer solutions, including those used in biological or molecular detection systems as known by those skilled in the art. While water-soluble nanoparticles are not truly 'dissolved' in the sense that term is used to describe individually solvated small molecules, they are solvated and suspended in solvents that are compatible with their outer surface layer, thus a nanoparticle that is readily dispersed in water is considered water-soluble or water-dispersible. A water-soluble nanoparticle can also be considered hydrophilic, since its surface is compatible with water and with water solubility.

"Hydrophobic nanoparticle" as used herein can refer to a nanoparticle that can be readily dispersed in or dissolved in a water-immiscible solvent like hexanes, toluene, and the like. Such nanoparticles are generally not readily dispersed in water.

A typical single-color preparation of nanoparticles has crystals that are preferably of substantially identical size and shape. Nanocrystals are typically thought of as being spherical or nearly spherical in shape, but can actually be any shape. Alternatively, the nanocrystals can be non-spherical in shape. For example, the nanocrystal's shape can change towards oblate spheroids for redder colors. It is preferred that at least about 60%, at least about 70%, at least about 80%, at least about 90%, at least about 95%, and ideally about 100% of the particles are of the same size. Size deviation can be measured as root mean square ("rms") of the diameter, with less than about 30% rms, preferably less than about 20% rms, more preferably less than about 10% rms. Size deviation can be less than about 10% rms, less than about 9% rms, less than about 8% rms, less than about 7% rms, less than about 6% rms, less than about 5% rms, or ranges between any two of these values. Such a collection of particles is sometimes referred to as being "monodisperse". One of ordinary skill in the art will realize that particular sizes of nanocrystals, such as of semiconductor nanocrystals, are generally obtained as particle size distributions.

The nanocrystal core and shell can be made of any suitable metal and non-metal atoms that are known to form semiconductor nanocrystals. Suitable semiconductor materials for the core and/or shell include, but are not limited to, ones including Group 2-16, 12-16, 13-15 and 14 element-based semiconductors such as ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InP, InAs, InSb, AlAs, AlP, AlSb, PbS, PbSe, Ge and Si and binary, ternary and quaternary mixtures thereof. Typically, the core and the shell of a core/shell nanocrystal are composed of different semiconductor materials, meaning that at least one atom type of a binary semiconductor material of the core of a core/shell is different from the atom types in the shell of the core/shell nanocrystal.

Nanocrystal sizes are typically from about 1 nm to about 100 nm in diameter, sometimes from about 1 to about 50 nm in diameter, and sometimes from about 1 to about 25 nm in diameter. More specific ranges of sizes for nanocrystals can include, but are not limited to: about 0.5 nm to about 5 nm, about 1 nm to about 50 nm, about 2 nm to about 50 nm, about 1 nm to about 20 nm, about 2 nm to about 20 nm, or from about 2 to about 10 nm. More specific size examples for nanocrystals can include, but are not limited to: about 0.1 nm, about 0.5 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 25 nm, about 30 nm, about 35 nm, about 40 nm, about 45 nm, about 50 nm, and ranges between any two of these values. For a nanocrystal that is not substantially spherical, e.g. rod-shaped, it may be from about 1 to about 100 nm, or from about 1 nm to about 50 nm or 1 nm to about 25 nm in its smallest dimension.

In some embodiments, a core nanocrystal can be less than about 10 nm in diameter, or less than about 7 nm in diameter, or less than about 5 nm in diameter. The small size of these nanocrystals can be advantageous in many applications, particularly because the nanocrystals disclosed herein are unexpectedly bright for their size.

Nanocrystals can be characterized by their percent quantum yield of emitted light. For example, the quantum yield for the nanocrystals disclosed herein can be greater than about 10%, greater than about 20%, greater than about 30%, greater than about 40%, greater than about 50%, greater than about 60%, greater than about 70%, greater than about 80%, greater than about 90%, and ranges between any two of these values. The quantum yield is typically greater than about 30%, and preferably greater than 50% or greater than 70%.

The nanocrystal can be of any suitable size; typically, it is sized to provide fluorescence in the UV-Visible portion of the electromagnetic spectrum, since this range is convenient for use in monitoring biological and biochemical events in relevant media. The relationship between size and fluorescence wavelength is well known, thus making nanoparticles smaller may require selecting a particular material that gives a suitable wavelength at a small size, such as ZnTe as the core of a core/shell nanocrystal designed to be especially small. In frequent embodiments, the nanocrystals described herein can be from about 1 nm to about 100 nm in diameter, sometimes from about 1 to about 50 nm in diameter, and sometimes from about 1 to about 25 nm in diameter. For a nanocrystal that is not substantially spherical, e.g. rod-shaped, it can be from about 1 to about 100 nm, or from about 1 nm to about 50 nm or 1 nm to about 25 nm in its smallest dimension.

It is well known that the color (emitted light) of the semiconductor nanocrystal can be "tuned" by varying the size and composition of the nanocrystal. Nanocrystals can absorb a wide spectrum of wavelengths, and emit a narrow wavelength of light. The excitation and emission wavelengths are typically different, and non-overlapping. The nanoparticles of a monodisperse population may be characterized in that they produce a fluorescence emission having a relatively narrow wavelength band. Examples of emission widths (FWHM) include less than about 200 nm, less than about 175 nm, less than about 150 nm, less than about 125 nm, less than about 100 nm, less than about 75 nm, less than about 60 nm, less than about 50 nm, less than about 40 nm, less than about 30 nm, less than about 20 nm, and less than about 10 nm. The width of emission is preferably less than about 50 nm, and more preferably less than about 30 nm at full width at half maximum of the emission band (FWHM). The emitted light preferably has a symmetrical emission of wavelengths. The emission maxima can generally be at any wavelength from about 200 nm to about 2,000 nm. Examples of emission maxima can include, but are not limited to: about 200 nm, about 400 nm, about 600 nm, about 800 nm, about 1,000 nm, about 1,200 nm, about 1,400 nm, about 1,600 nm, about 1,800 nm, about 2,000 nm, and ranges between any two of these values.

In one aspect, the embodiments disclosed herein provide a method of producing a shell on a primary nanocrystal (i.e., shell formation reaction) or population thereof, the method comprising contacting the primary nanocrystal with a reaction mixture containing a first shell precursor, a second shell precursor, and an electron transfer agent (it should be noted that the electron transfer agent can sometimes act as a solvent), optionally in a solvent (which may be a mixture), wherein the first and second shell precursors are mismatched in their oxidation states, e.g., one of the two shell precursors provides an ionic species for shell formation and the other shell precursor provides a non-ionic species for shell formation, or both the shell precursors are ionic species that have mismatched oxidation states that do not allow them to react with one another to form the shell on the nanocrystal. Preferably the mixture contains no strong electron transfer agents. The effect of using a weak electron transfer agent in the absence of strong electron transfer agents is illustrated in FIG. 1.

In one embodiment, the weak electron transfer agent is a reducing agent. In another embodiment the weak electron transfer agent is an oxidizing agent. It should be appreciated, however, that the same electron transfer agent can function as either an oxidizing or reducing agent depending on the particular shell precursors that are used in the shell formation reaction.

In another aspect, the embodiments disclosed herein provide a method for making a semiconductor shell on a primary nanocrystal or population thereof, comprising:

a) forming a reaction mixture comprising the primary nanocrystal, a first shell precursor, a second shell precursor, a weak electron transfer agent, and optionally a solvent; and b) heating the reaction mixture to a temperature high enough to induce formation of the semiconductor shell on the primary nanocrystal.

In some embodiments, the reaction temperature ranges from about 100° C. to about 300° C. In other embodiments, the reaction temperature ranges from about 150° C. to about 290° C. In still other embodiments, the reaction temperature ranges from about 200° C. to about 285° C.

In some embodiments, one of the shell precursors is an ionic species under the reaction conditions employed and the other a non-ionic (i.e., neutral) species under the reaction species employed. In other embodiments, both the shell precursors are ionic species under the reaction conditions employed.

The ionic species can be an anion or a cation. The neutral species can be either the metal or the nonmetal. In some embodiments, one of the shell precursors provides a metal atom species and the other provides a nonmetal atom species, wherein the metal and non-metal species are selected to form a desired semiconductor material.

In another aspect, the embodiments disclosed herein provide a method to form shells on a nanocrystal or population thereof, comprising:

a) forming a reaction mixture comprising a nanocrystal, a first shell precursor, a second shell precursor, a weak electron transfer agent, and optionally a solvent, wherein, the first shell precursor and the second shell precursor have different oxidation states;

b) changing the oxidation state of the first shell precursor or the second shell precursor using the weak electron transfer agent such that the first shell precursor and the second shell precursor can react to form a shell around the nanocrystal; and c) heating the reaction mixture to a temperature high enough to induce formation of the shell on the nanocrystal.

In some embodiments, the reaction temperature ranges from about 100° C. to about 300° C. In other embodiments, the reaction temperature ranges from about 150° C. to about 290° C. In still other embodiments, the reaction temperature ranges from about 200° C. to about 285° C.

In some embodiments, the first shell precursor and the second shell precursor will not form a shell on the nanocrystal under the same reaction conditions as those described above if the weak electron transfer agent is omitted.

In some embodiments, one of the shell precursors is an ionic species under the reaction conditions employed and the other a non-ionic (i.e., neutral) species under the reaction species employed. In other embodiments, both the shell precursors are ionic species under the reaction conditions employed.

In one embodiment, the weak electron transfer agent is a reducing agent. In another embodiment the weak electron transfer agent is an oxidizing agent. It should be appreciated, however, that the same electron transfer agent can function as either an oxidizing or reducing agent depending on the particular shell precursors that are used in the shell formation reaction.

In still another aspect, the embodiments disclosed herein provide a method for making a core/shell nanocrystal or population thereof, comprising:

a) providing a mixture comprising a first shell precursor, a second shell precursor, a weak electron transfer agent, and optionally a solvent;

b) providing a primary nanocrystal; and c) contacting the primary nanocrystal with the mixture, whereby a shell is formed on the primary nanocrystal without formation of nanoparticles produced from the first shell precursor and the second shell precursor.

In some embodiments, one of the shell precursors is an ionic species under the reaction conditions employed and the other a non-ionic (i.e., neutral) species under the reaction species employed. In other embodiments, both the shell precursors are ionic species under the reaction conditions employed.

The ionic species can be an anion or a cation. The neutral species can be either the metal or the nonmetal. In some embodiments, one of the shell precursors provides a metal atom species and the other provides a nonmetal atom species, wherein the metal and non-metal species are selected to form a desired semiconductor material.

In some embodiments, the first shell precursor and the second shell precursor will not form a semiconductor shell on the primary nanocrystal under the same reaction conditions as those described above if the weak electron transfer agent is omitted.

The primary nanocrystal for each of the aspects disclosed above can be a semiconductor nanocrystal, and it can be a core nanocrystal, or it can be a core/shell nanocrystal, already having a first shell and being treated to form an additional shell. In many embodiments, the shell layer applied can comprise a different semiconductor material from the material(s) of the outer layer of the primary nanocrystal. The first shell precursor can be one that provides an ionic atom species, which can be an anion or a cation. In some embodiments, the first shell precursor can comprise a metal, and provides a metal cation for nanocrystal formation, for example, $Zn^{2+}$ or $Cd^{2+}$. In some embodiments, the first shell precursor can provide a neutral nonmetal atom for nanocrystal formation, such as S, Se, or Te, and it can provide an ionic nonmetal atom as an anion such as $S^{2-}$, $Se^{2-}$, or $Te^{2-}$. Examples of suitable shell precursors are discussed below.

The weak electron transfer agent is one selected for its ability to promote shell formation of mismatched precursors without promoting nucleation. In some embodiments, shell formation does not proceed in the absence of the weak transfer agent. In some embodiments, the weak transfer agent is selected based on criteria described herein, including determining that it does not promote or accelerate the rate of nucleation of the shell precursors under the reaction conditions used, in the absence of any preformed nanocrystal, referred to herein as a primary nanocrystal. Examples of suitable weak transfer agents are discussed below.

The reaction may be conducted in a suitable solvent (which can be a mixture of two or more solvents) and at a suitable temperature for shell formation to occur. Selection of suitable solvents and temperatures and other parameters such as concentration of precursors are within the level of ordinary skill in the art, in view of known methods for making semiconductor shell layers on nanocrystals.

In some embodiments, the aspects disclosed above can be performed in a discrete batch reaction system such as a simple reaction flask or a bulk batch reactor where the final core/shell nanocrystal product is formed in discrete batches. In other embodiments, the shell reaction can be performed using a continuous flow reaction system such as a single-stage or multi-stage reactor where the reactants are continuously fed into the reactor and emerge as continuous stream of core/shell nanocrystal product.

In another aspect, the disclosed embodiments provide a nanocrystal made by the methods described herein, as well as nanoparticles comprising such nanocrystals with associated coatings, and methods of using such nanoparticles.

Precursors

The formation of semiconductor solids (e.g., core nanocrystals or core/shell nanocrystals) is often considered to have two distinct phases: the first stage, nucleation, requires a multiple precursor atoms to coalesce into a tiny particle, while the second stage, growth, involves the addition of precursor atoms (e.g., core nanocrystal precursors or shell precursors) to the existing nuclei. Where precursor atoms are matched in type (e.g., both are nonionic (neutral), or one has a cationic charge that is complementary to the other's anionic charge to allow the formation of an ionic bond), they usually react very rapidly. Such rapid reaction often produces nucleation, even where nucleation is undesirable, as in a reaction intended to produce a shell (using shell precursors) on existing nanoparticles (e.g., core nanocrystals). An ideal shell-forming reaction would avoid any substantial nucleation, since nucleation that occurs in a shell-forming reaction produces a mixture of nanoparticles having different compositions and/or different sizes.

Independent control over these two formation stages is valuable, because the nucleation phase determines the particle yield, while the growth phase determines the ultimate size. It is important to separate the nucleation phase from the growth phase in nanocrystal formation so that all the nanocrystals form at roughly the same time and then all grow together for the same amount of time to result in a uniform distribution of particle sizes, providing a substantially monodisperse population of nanocrystals. Uniform size is difficult to achieve if new tiny nuclei are forming after other particles have formed and grown for a period of time. The embodiments disclosed herein utilize a method for separating nucleation from growth, and thus provides improved nanocrystal populations.

In the disclosed embodiments, control of the two phases of particle formation can be achieved by the use of "mismatched" precursors. Mismatched precursors cannot react without addition or loss of electrons such that both precursors in solution are present at some concentration in either a complementary ionic state or a neutral state. The lack of reactivity of 'mismatched' precursors in the absence of an electron transfer agent, such as a reducing agent or an oxidizing agent, can be exploited to temporally separate the nucleation and growth phases of particle formation; control is achieved by selection and use of an electron transfer agent in the reaction mixture, along with the mismatched shell precursors.

The precursors of the embodiments disclosed herein will be considered 'mismatched' if one precursor provides a neutral species for shell formation in solution while the other precursor provides an ionic species in solution under the reaction conditions used, or if the precursors each provide an ionic species having the same charge (i.e., two cations or two anions), or if one precursor has a cationic charge that is not complementary to the other's anionic charge to allow the formation of an ionic bond. Examples of mismatched precursors include, but are not limited to, a precursor that provides a cation species (i.e., $Cd^{2+}$) paired with a precursor that provides a non-ionic (i.e., neutral) species (i.e., $Se^0$) or another cation (i.e., $Se^{2+}$), a precursor that provides an anionic species (i.e., $S^{2-}$) paired with a precursor that provides a non-ionic (i.e., neutral) species (i.e., $Zn^0$) or another anionic species (i.e., $Zn^{2-}$), or a precursor cation (i.e., $Zn^{2+}$) that has a non-complimentary charge to a precursor anion (i.e., $S^{4-}$). The relevant species is the reacting species present in the shell-forming reaction conditions. Thus, as further discussed herein, a dialkylzinc compound is often considered a non-ionic precursor, because the reactive species under many common shell-forming conditions is $Zn^0$, formed by rapid pyrolysis of diethyl zinc in the reaction mixture.

The nanocrystal core and shell can be made of any suitable metal and non-metal atoms that are known to form semiconductor nanocrystals. Suitable semiconductor materials for the core and/or shell include, but are not limited to, ones including Group 2-16, 12-16, 13-15 and 14 element-based semiconductors, such as, e.g., ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InN, InP, InAs, InSb, AlAs, AlP, AlSb, PbS, PbSe, Ge and Si and binary, ternary and quaternary mixtures thereof.

The selection of the composition of the semiconductor nanoparticle affects the characteristic spectral emission wavelength of the particle. Thus, as one of ordinary skill in the art will realize, a particular composition of a nanoparticle of the embodiments disclosed herein will be selected based upon the spectral region being monitored. For example, semiconductor nanocrystal cores that emit energy in the visible range can include, but are not limited to, CdS, CdSe, CdTe, ZnSe, ZnTe, GaP, and GaAs. Semiconductor nanocrystals that emit energy in the near IR range include, but are not limited to, InP, InAs, InSb, PbS, and PbSe. Finally, semiconductor nanocrystal cores that emit energy in the blue to near-ultraviolet include, but are not limited to, ZnS and GaN. These wavelengths can be altered somewhat, of course, by adjusting the size of the nanocrystal core, or to some degree by the shell that is applied to the nanocrystal core.

Precursors useful as the "first" shell precursor in the methods disclosed herein include, but are not limited to, compounds containing elements from Groups 2 and 12 of the Periodic Table of the Elements (e.g., Zn, Cd, Hg, Mg, Ca, Sr, Ba, and the like), compounds containing elements from Group 13 of the Periodic Table of the Elements (Al, Ga, In, and the like), and compounds containing elements from Group 14 of the Periodic Table of the Elements (Si, Ge, Pb, and the like). Many forms of the precursors can be used in the methods disclosed herein.

Compounds useful as the first precursor can be organometallic compounds such as alkyl metal species, or salts such as metal halides, metal acetates, metal carboxylates, metal oxides, or other salts. In some embodiments, the first precursor provides a neutral species in solution. For example, alkyl metal species such as diethylzinc ($Et_2Zn$) and dimethyl cadmium are typically considered to be a source of neutral zinc atoms ($Zn^0$) and neutral cadmium atoms in solution under shell-forming reaction conditions which promote heterolytic cleavage e.g. via pyrolysis over hemolytic cleavage e.g. via protonation. In other embodiments, the first precursor provides an ionic species (i.e., a metal cation) in solution. For example, zinc chloride ($ZnCl_2$) and other zinc halides, zinc acetate ($Zn(OAc)_2$) and zinc carboxylates are typically considered to be sources of $Zn^{2+}$ cations in solution, and cadmium salts like cadmium oxide, cadmium acetate, and $Cd(TDPA)_2$ are sources of $Cd^{2+}$ cations in solution under the shell-forming reaction conditions.

By way of example only, suitable first precursors providing neutral metal species include dialkyl metal sources, such as dimethyl cadmium ($Me_2Cd$), diethyl zinc ($Et_2Zn$), and the like. Suitable first precursors providing metal cations in solution include, e.g., cadmium salts, such as cadmium acetate ($Cd(OAc)_2$), cadmium nitrate ($Cd(NO_3)_2$), cadmium oxide (CdO), and other cadmium salts; and zinc salts such as zinc chloride ($ZnCl_2$), zinc acetate ($Zn(OAc)_2$), zinc oleate ($Zn(oleate)_2$), zinc oleate chloride ($Zn(oleate)Cl$), and other zinc salts. In some embodiments, the first precursor is a salt of Cd or Zn. In some embodiments, it is a halide, acetate, carboxylate, phosphonate, or oxide salt of Cd or Zn. In other embodiments, the first precursor is a salt of the form $M(O_2CR)X$, wherein M is Cd or Zn; X is a halide of $O_2CR$; and R is a $C_4$-$C_{24}$ alkyl group that is optionally unsaturated. Other suitable forms of Groups 2, 12, 13 and 14 elements useful as first precursors are known in the art.

Precursors useful as the "second" shell precursor in the methods disclosed herein include compounds containing elements from Group 16 of the Periodic Table of the Elements (e.g., S, Se, Te, and the like), compounds containing elements from Group 15 of the Periodic Table of the Elements (N, P, As, Sb, and the like), and compounds containing elements from Group 14 of the Periodic Table of the Elements (Ge, Si, and the like). Many forms of the precursors can be used in the methods disclosed herein. It will be understood that in some embodiments, the second precursor will provide a neutral species in solution, while in other embodiments the second precursor will provide an ionic species in solution.

When the first precursor provides a metal cation under the shell-forming reaction conditions, the second precursor will preferably provide an uncharged (i.e., neutral) non-metal atom in solution. In frequent embodiments, when the first precursor comprises a metal cation, the second precursor contributes a neutral chalcogen atom, most commonly $S^0$, $Se^0$ or $Te^0$.

Suitable second precursors for providing a neutral chalcogen atom can include, but are not limited to, elemental sulfur (often as a solution in an amine, e.g., decylamine, oleylamine, or dioctylamine, or an alkene, such as octadecene, or in its molten elemental form), and tri-alkylphosphine adducts of S, Se and Te. Such trialkylphosphine adducts are sometimes described herein as $R_3P=X$, wherein X can be S, Se or Te, and each R can independently be H, or a C1-C24 hydrocarbon group that can be straight-chain, branched, cyclic, or a combination of these, and which can be unsaturated. Exemplary second precursors of this type can include tributylphosphine selenide (TBP=Se), trioctylphosphine selenide (TOP=Se), and the corresponding sulfur and tellurium reagents, TBS=S, TOP=S, TBS=Te and TOP=Te. These reagents are frequently formed by combining a desired element, such as Se, S, or Te with an appropriate coordinating solvent, e.g., TOP or TBP.

In some embodiments, the second precursor can provide a negatively charged non-metal ion in solution (e.g., $S^{-2}$, $Se^{-2}$ or $Te^{-2}$). Examples of suitable second precursors providing an ionic species can include silyl compounds such as bis(trimethylsilyl)selenide ($(TMS)_2Se$), bis(trimethylsilyl) sulfide ($(TMS)_2S$) and bis(trimethylsilyl)telluride ($(TMS)_2Te$). Also included are hydrogenated compounds such as $H_2Se$, $H_2S$, $H_2Te$; and metal salts such as NaHSe, NaSH or NaHTe. These precursors that provide anionic atoms under the shell-forming reaction conditions are typically used with a first precursor that provides a neutral metal atom, such as alkylmetal compounds and others described above. In this situation, an oxidant can be used to oxidize a neutral metal species to a cationic species that can react with the anionic precursor in a 'matched' reaction, or an oxidant can be used increase the oxidation state of the anionic precursor to provide a neutral species that can undergo a 'matched' reaction with a neutral metal species.

Other exemplary organic precursors are described in U.S. Pat. Nos. 6,207,299 and 6,322,901 to Bawendi et al., and synthesis methods using weak acids as precursor materials are disclosed by Qu et al., (2001), *Nano Lett.*, 1(6):333-337, the disclosures of which are incorporated herein by reference.

Both the first and the second shell precursors can be combined with an appropriate coordinating solvent to form a solution for use in the methods disclosed herein. The coordinating solvent used to form a first precursor solution may be the same or different from that used to form a second precursor solution. The precursors can be dissolved separately, or they can be combined together into a single solution.

Heating of the mixture can be performed before mixing or after mixing of the shell precursors together, and either before or after combining the precursors with a weak electron transfer agent, optionally in a solvent agent. In some embodiments, the first and second shell precursors, primary nanocrystals, and weak electron transfer agent are all combined in a suitable solvent or mixture of solvents to form a reaction mixture, and the reaction mixture can subsequently be heated to a suitable temperature to promote shell formation.

The order and rate of addition of the shell precursors is generally not critical to the methods disclosed herein. Indeed, while prior methods often involve the slow addition of one of the shell precursors in order to avoid undesired nucleation events during the shell-formation reaction, using the mismatched precursors and weak electron transfer agents of the embodiments disclosed herein permits the user to avoid a need for careful, slow addition of the precursors if rapid addition is preferred. In some embodiments, the shell precursors are thus added at a rate that is limited only by practical factors associated with maintaining the desired reaction temperature, and addition of the precursors can be done as quickly as temperature control permits. Similarly, the precursors can all be present in the reaction mixture when it is heated to a desired reaction temperature, and the electron transfer agents can be added after the operating temperature has been reached.

Coordinating Solvents

Suitable solvents for use with the shell precursors and the shell-forming reaction are known in the art. In many embodiments, the reaction can be performed in a solvent mixture that comprises at least one coordinating solvent. Suitable coordinating reaction solvents include, by way of illustration and not limitation, unsaturated hydrocarbons, amines, alkyl phosphines, alkyl phosphine oxides, fatty acids, ethers, furans, phosphoacids, pyridines, alkenes, alkynes and mixtures thereof. The solvent may actually comprise a mixture of solvents, often referred to in the art as a "solvent system".

Further the coordinating solvent might be a mixture of an essentially non-coordinating solvent such as an alkane (saturated hydrocarbon) and a ligand as defined below.

Suitable hydrocarbons include alkanes, alkenes and aromatic hydrocarbons from 10 to about 30 carbon atoms; examples include octadecene and squalane. The hydrocarbon may comprise a mixture of alkane, alkene and aromatic moieties, such as alkylbenzenes (e.g., mesitylene).

Suitable amines include, but are not limited to, monoalkylamines, dialkylamines, and trialkylamines, for example dioctylamine, oleylamine, decylamine, dodecylamine and hexyldecylamine, and so forth. Alkyl groups for these amines typically contain about 6-24 carbon atoms per alkyl, and can include an unsaturated carbon-carbon bond, and each amine typically has a total number of carbon atoms in all of its alkyl groups combined of about 10-30 carbon atoms.

Exemplary alkyl phosphines include, but are not limited to, the trialkyl phosphines, tributylphosphine (TBP), trioctylphosphine (TOP), and so forth. Alkyl groups for these phosphines contain about 3-24 carbon atoms per alkyl, and can contain an unsaturated carbon-carbon bond, and each phosphine has a total number of carbon atoms in all of its alkyl groups combined of about 10-30 carbon atoms.

Suitable alkyl phosphine oxides include, but are not limited to, the trialkyl phosphine oxide, trioctylphosphine oxide (TOPO), and so forth. Alkyl groups for these phosphine oxides contain about 6-24 carbon atoms per alkyl, and can contain an unsaturated carbon-carbon bond, and each phosphine oxide has a total number of carbon atoms in all of its alkyl groups combined of about 10-30 carbon atoms.

Exemplary fatty acids include, but are not limited to, stearic, oleic, palmitic, myrsitic, and lauric acids, as well as other carboxylic acids of the formula R—COOH, wherein R is a C6-C24 hydrocarbon group and can contain an unsaturated carbon-carbon bond. It will be appreciated that the rate of nanocrystal growth generally increases as the length of the fatty acid chain decreases.

Exemplary ethers and furans include, but are not limited to, tetrahydrofuran and its methylated forms, glymes, and so forth.

Suitable phosphonic and phosphinic acids include, but are not limited to hexylphosphonic acid (HPA), tetradecylphosphonic acid (TDPA), and octylphosphonic acid (OPA), and are frequently used in combination with an alkyl phosphine oxide such as TOPO. Suitable phosphonic and phosphinic acids are of the formula $RPO_3H_2$ or $R_2PO_2H$, wherein each R is independently a C6-C24 hydrocarbon group and can contain an unsaturated carbon-carbon bond.

Exemplary pyridines include, but are not limited to, pyridine, alkylated pyridines, nicotinic acid, and so forth.

Suitable alkenes include, e.g., octadecene and other C4-C24 hydrocarbons that are unsaturated.

Coordinating solvents can be used alone or in combination. TOP-TOPO solvent systems are commonly utilized in the art, as are other related (e.g., butyl) systems. For example, TOP and TOPO can be used in combination to form a cadmium solution, while TOP, alone, can be used to form a selenium solution.

Technical grade coordinating solvents can be used, and benefits can be obtained from the existence of beneficial impurities in such solvents, e.g. TOP, TOPO or both. However, in one preferred embodiment, the coordinating solvent is pure. Typically this means that the coordinating solvent contains less than 10 vol %, and more preferably less than 5 vol % of impurities that can function as reductants. Therefore, solvents such as TOPO at 90% or 97% purity and TOP at 90% purity are particularly well suited for use in the methods disclosed herein; and solvents that are at least 99% pure are preferred.

The presence of minor amounts of impurities can provide unexpected sources of electron transfer agents, and these can defeat the objectives of the embodiments disclosed herein if they promote nucleation of the mismatched shell precursors. Moreover, a particular reagent may be a weak electron transfer agent for one system and a strong electron transfer agent, or an ineffective reducing agent, in a different system: weak and strong are necessarily dependent upon the specific shell precursors being used for the shell-forming reaction, as well as the solvent and temperature being used. Therefore, in some embodiments, a reagent to be used is evaluated for its effect in the particular system. For example, an unsaturated bond can be in some systems a weak reducing agent, as discussed herein; in other systems, it might be ineffective as a weak reducing agent, and a weak reducing agent would need to be added to promote shell formation, even if that unsaturated bond were present, such as in a metal salt containing an unsaturated group like oleate.

The suitability of a reagent, solvent, electron transfer agent, or shell precursor for the present methods can be determined by testing it to see whether that substance functions as, or contains impurities that function as, a strong electron transfer agent in the system of interest. Where a reagent functions as or contains impurities that function as a strong electron transfer agent, the reagent would be removed, replaced, or further purified for the methods disclosed herein, which utilize only a weak electron transfer agent and no strong electron transfer agents. Thus in some embodiments, the methods disclosed herein involve a reaction mixture that contains no strong electron transfer agent. Where appropriate, the absence of strong electron transfer agents can be determined by methods herein.

Ligands

In one preferred embodiment, ligands can be included in the reaction. Ligands are any compound that can complex with a precursor and/or a nanoparticle. Suitable ligands include, by way of illustration and not limitation, phosphonic and phosphinic acids such as hexylphosphonic acid, octylphosphonic acid (OPA) and tetradecylphosphonic acid (TDPA), thiols, peptides, carboxylic acids such as isomers of octadecanoic acid, amines, amides, alcohols, ethers, alkenes, and alkynes. In some cases, the ligand can be a solvent used in the shell-forming reactions.

Electron Transfer Agent: Reductants

In the embodiments disclosed herein, control of the nucleation and growth phases of particle formation can be achieved by the use of mismatched precursors which cannot react without addition or loss of electrons. In some embodiments, the shell-forming reactions disclosed herein utilize a weak reductant and no strong reductant, so that the reaction promotes shell-formation with the mismatched precursors and does not produce any substantial nucleation of the shell-forming precursors.

As used herein, a "strong" or "stronger" reductant (reducing agent) refers to a reductant that is capable of promoting nucleation, or initiation of particle formation, under the specific conditions of the reaction in which it is employed. A "weak" or "weaker" reductant refers to a reductant that is not capable of promoting nucleation or initiation of particle formation under the specific conditions employed, but may be capable of promoting particle growth under those conditions. As will be appreciated by those of skill in the art, whether a particular reducing agent is a strong reductant or a weak reductant must take into account the species to be reduced and the conditions of the reaction (solvent, temperature).

It will be understood by one of skill in the art that whether a particular reductant is a strong reductant or weak reductant is context specific, and will depend upon the particular reaction conditions in which it is employed. Electron transfer can proceed more readily at the surface of a growing particle (i.e. during the growth phase) than on a free ion in solution, as required for nucleation. Trial reductants can be categorized as strong or weak for a given system (shell-forming reaction conditions) by determining whether the trial reductant behaves as a strong or weak reducing agent. One can determine if a particular trial reducing agent is a strong reducing agent by contacting the particular shell precursors of interest with the trial reducing agent under the shell-forming reaction conditions in the absence of any primary nanocrystal, so nucleation can be observed: generally, if nucleation occurs at a significant rate, e.g., at a rate that is at least about 50% higher than the rate of nucleation in the absence of the trial reducing agent, the trial reducing agent is promoting nucleation and can be considered a strong reducing agent in that system. If the rate of nucleation is not significantly increased by the presence of the trial reducing agent, it is not considered a strong reducing agent in that system.

One can determine if a particular trial reducing agent is a weak reducing agent by contacting the particular shell precursors of interest with the trial reducing agent under the shell-forming reaction conditions in the presence of a primary nanocrystal: generally, if shell formation occurs at an increased rate, e.g., at a rate that is at least twice as high as the rate of shell formation in the absence of the trial reducing agent, the trial reducing agent can be considered a reducing agent suitable for promoting formation of a shell on a primary nanocrystal. It thus may be a suitable weak reducing agent, provided it does not function as a strong reducing agent in the system of interest.

A trial reducing agent can be considered a weak reducing agent if it is suitable for promoting formation of a shell on a primary nanocrystal, but is not a strong reducing agent in the particular system of interest. Because the relative strength of a reducing agent is dependent upon these factors, this functional categorization of reducing agents is a useful method to categorize a weak or strong reducing agent that can be applied to any particular trial reductant by routine testing.

Suitable reducing agents can include, by way of illustration and not limitation, chemical compounds such as tertiary phosphines, secondary phosphines, primary phosphines (e.g., diphenylphosphine, dicyclohexylphosphine, and dioctylphosphine); amines (e.g., decyl- and hexadecylamine, dioctylamine, etc.); hydrazines, hydroxyphenyl compounds (e.g., hydroquinone and phenol); hydrides (e.g., sodium borohydride, lithium triethyl borohydride, sodium hydride and lithium aluminum hydride, and the like); metals (e.g., mercury and potassium); boranes (e.g., THF:$BH_3$ and $B_2H_6$); aldehydes (e.g., benzaldehyde and butyraldehyde); alcohols and thiols (e.g., ethanol and thioethanol); reducing halides(e.g., $I^-$ and $I_3^-$); alkenes (e.g., oleic acid); alkynes; and polyfunctional reductants, i.e., a single chemical species that contains more than one reductant moiety, each reductant moiety having the same or different reducing capacity, such as tris-(hydroxypropyl)phosphine and ethanolamine); and so forth.

Typically, hydrides (metal hydrides like aluminum hydrides or metal borohydrides) and boranes can function as strong reductants, and are thus unlikely to be suitable for most of the systems of interest. Other reducing agents can function as either a strong reductant or a weak reductant, depending on the specific reaction conditions. For example, an alkylphosphine can function as a strong reductant in a synthesis of CdSe, but would be a weak reductant in a synthesis of ZnTe. Still other reductants, such as alkenes, alkynes, certain amines, and the like, are typically weak reducing agents.

In some systems, the reductant can be provided by a component of one of the shell precursors. For example, an unsaturated carboxylate group, such as an oleate, can serve as a weak reductant for purposes of some of the disclosed embodiments. In some embodiments, to provide a weak reductant to promote shell formation, the metal-containing precursor can sometimes be provided as a salt of the form $M(O_2C—R')_n$, where M is the metal, n is an integer from 1-3 that can be determined by the oxidation state of the metal atom, and R' can be a $C_4$-$C_{24}$ unsaturated hydrocarbon group. In other embodiments, the salt comprises one such unsaturated carboxylate counterion and one or more other counterions. These provide convenient ways to provide a weak reductant without adding additional materials to the reaction mixture, and can ensure that a stoichiometry provides at least one weak reductant molecule per precursor atom. However, in some systems it may be necessary to determine that these function as weak and not as strong reductants.

In some embodiments, to form a zinc-containing shell, the first precursor can be a zinc salt. In some such embodiments, the zinc salt can preferably be an unsaturated alkyl carboxylic acid salt, such as oleate or undecylenate. A preferred zinc salt is Zn(oleate)Cl, Zn(oleate)$_2$, Zn(undecylenate)Cl or Zn(undecylenate)$_2$. The zinc salt can be prepared in situ by using diethyl zinc or other dialkyl zinc species, and allowing the dialkyl zinc to react with the unsaturated carboxylic acid. The reaction of diethyl zinc with oleic acid, for example, provides zinc oleate, and produces ethane as a byproduct. This works for the shell-formation reaction. However, better results are sometimes achieved by using zinc chloride plus oleic acid to form the zinc salt having at least one unsaturated carboxylic acid ligand.

It is expected that there may be particular advantages associated with the use of an electrochemical system (cathode-anode system) as the reducing agent, i.e., the cathode would serve as a source of electrons. By utilizing an electrode as a source of reducing equivalents, coulombic equivalents can be readily counted and their rate of delivery directly controlled. Use of electrodes also allows for controlling both the physical localization of reduction events, as well as the potential for direct formation of particle arrays at the electrode surface. Since the cathode will be positioned within the reaction chamber, the material selection is preferably one that will not react with the precursors, ligands or coordinating solvents. The anode will typically be positioned outside of the reaction vessel so material selection is not limited and any well known anode material can be used. Exemplary cathode materials include platinum, silver, or carbon. An exemplary method for delivering reducing equivalents to the cathode includes the use of a constant current or potentiostat in a two-electrode (working and counter) or three-electrode (working, counter, and reference) configuration. The reduction potential of an electrochemical electrode can also be adjusted to provide a weak reducing capability under the shell-forming reaction conditions of interest.

The selection of suitable reductants for a particular combination of precursors is within the level of skill in the art.

Electron Transfer Agent: Oxidants

As disclosed herein, control of the nucleation and growth phases of particle formation can be achieved through the use of mismatched precursors which cannot react without addition or loss of electrons. The shell-forming reactions disclosed herein can utilize a weak oxidant and not strong oxidant, so that the reaction promotes shell-formation with the mismatched precursors and does not produce any nucleation of the shell-forming precursors.

As used herein, a "strong" or "stronger" oxidant (oxidizing agent) refers to an oxidant that is capable of promoting nucleation, or initiation of particle formation, under the specific conditions of the reaction in which it is employed. A "weak" or "weaker" oxidant refers to a reductant that is not capable of promoting nucleation or initiation of particle formation under the specific conditions employed, but may be capable of promoting particle growth under those conditions. As will be appreciated by those of skill in the art, whether a particular oxidizing agent is a strong oxidant or a weak oxidant must take into account the species to be oxidized and the conditions of the reaction (solvent, temperature).

It will be understood by one of skill in the art that whether a particular oxidant is a strong oxidant or weak oxidant is context specific, and will depend upon the particular reaction conditions in which it is employed. Electron transfer often proceeds more readily at the surface of a growing particle (i.e. during the growth phase) than on a free ion in solution, as required for nucleation. Trial oxidants can be categorized as strong or weak for a given system (shell-forming reaction conditions) by determining whether the trial oxidant behaves as a strong or weak oxidizing agent. One can determine if a particular trial oxidizing agent is a strong oxidizing agent by contacting the particular shell precursors of interest with the trial oxidizing agent under the shell-forming reaction conditions in the absence of any primary nanocrystal, so nucleation can be observed: if nucleation occurs at a significant rate, e.g., generally, at a rate that is at least 50% higher than the rate of nucleation in the absence of the trial oxidizing agent, the trial oxidizing agent is promoting nucleation and can be considered a strong oxidizing agent in that system. If the rate of nucleation is not significantly increased by the presence of the trial oxidizing agent, it can be considered to not be a strong oxidizing agent in that system.

One can determine if a particular trial oxidizing agent is a weak oxidizing agent by contacting the particular shell precursors of interest with the trial oxidizing agent under the shell-forming reaction conditions in the presence of a primary nanocrystal: if shell formation occurs at an increased rate, e.g., at a rate that is at least twice as high as the rate of shell formation in the absence of the trial reducing agent, the trial oxidizing agent is an oxidizing agent suitable for promoting formation of a shell on a primary nanocrystal. It thus may be a suitable weak oxidizing agent, provided it does not function as a strong oxidizing agent in the system of interest.

A trial oxidizing agent is a weak oxidizing agent if it is suitable for promoting formation of a shell on a primary nanocrystal, but is not a strong oxidizing agent in the particular system of interest. Because the relative strength of a oxidizing agent is dependent upon these factors, this functional categorization of oxidizing agents is a useful method to categorize a weak or strong oxidizing agent that can be applied to any particular trial oxidant by routine testing.

Suitable oxidizing agents can include, by way of illustration and not limitation, chemical compounds such as: potassium nitrate; salts of hypochlorite, chlorite, chlorate, perchlorate and other analogous halogen compounds; tert-butyl hypochlorite; halogens such as fluorine, chlorine, bromine, and iodine; permanganate salts and compounds; cerium ammonium nitrate; hexavalent chromium compounds such as chromic and dichromic acids and chromium trioxide, pyridinium chlorochromate (PCC), and chromate/dichromate compounds; peroxide compounds; Tollens' reagent; sulfoxides; persulfuric acid; oxygen; ozone; osmium tetroxide; nitric acid; nitrous oxide; silver (I) compounds; copper (II) compounds; molybdenum (IV) compounds; iron (III) compounds; manganese (IV) compounds; N-Methylmorpholine-N-Oxide and other N-oxides; trimethylamine N-oxide; 3-chloroperoxybenzoic acid, and other peroxy acids; or peracetic acid.

In some systems, the oxidant is provided by a component of one of the shell precursors. For example, in the synthesis of InP or InAs, an indium(I) precursor could be used, so that it would disproportionate into indium(III) and indium(0), in which case some of the indium atoms are serving as oxidants while the others are getting incorporated. Alternatively, a nitrate or perchlorate salt of the metal could be also used, with the oxyanion providing needed oxidizing equivalents.

Pre-Treating Primary Cores to Make Brighter Nanocrystals

It was further determined that the quality of the nanocrystal product can be improved by pre-treating the primary nanocrystal cores in a dialkylamine-containing solvent with a first shell precursor prior to addition of the second shell precursor, when the first precursor is a metal salt. Heating the cores with about 0.3 equivalents of a Zn salt (e.g., Zn(oleate)Cl), for example, prior to addition of a selenium precursor and the remaining amount of the zinc salt improved brightness of ZnTe/ZnSe core/shell nanoparticles significantly. FIG. 2 illustrates that there was a significant improvement in nanocrystal quality when ZnTe cores were pre-treated with a zinc salt at elevated temperature prior to adding the selenium precursor that is required for shell formation to begin, but that using more of the zinc salt for this pretreatment reduces the brightness (quantum yield) of the nanocrystal product.

Thus in another aspect, the embodiments disclosed herein provide a method for increasing the brightness of a nanocrystal having a nanocrystal core and a zinc chalcogenide shell, using a shell formation reaction. The method comprises pre-treatment of the primary core nanocrystal with an amount of a first shell precursor that is a metal salt in a solvent at an elevated temperature prior to adding the second shell precursor comprising a chalcogen atom to induce formation of a shell on the primary nanocrystal. In some embodiments this involves heating the primary cores with an amount of a zinc salt in a dialkylamine solvent prior to adding the second (chalcogen) shell precursor and remaining zinc salt. This process can increase the brightness of core/shell nanocrystals by about 10%, about 20%, about 30%, about 40%, about 50%, about 60%, about 70%, about 80%, about 90%, about 100% to as much as about 200%, relative to a process where the shell forming reaction is done by adding all of the metal-containing shell precursor before the second shell precursor is added. In some embodiments, the metal is zinc and the first shell precursor is a zinc salt. The second precursor can be one that provides a non-ionic chalcogen atom (e.g., O, S, Se, or Te) for shell formation. The solvent can be a dialkylamine. Preferably, the amount of the metal salt added during the pretreatment is less than, e.g., about 20-50% of the amount needed for formation of the complete shell thickness desired, and the balance of the amount of the first shell precursor needed for shell formation is added after the pretreatment. The pretreatment can involve heating the pre-treatment mixture for 1-60 minutes, such as about 5-20 minutes.

Methods of Producing Core/Shell Nanocrystals

The embodiments disclosed herein provide methods of producing core/shell nanocrystals, or applying a shell to an existing nanocrystal, using mismatched precursors in the presence of an intentionally added weak reductant. Optionally, two weak reducing agents can be used.

In one aspect, the embodiments disclosed herein provide a method of producing nanocrystals, the method comprising: (a) providing a mixture comprising a first shell precursor, a second shell precursor, a primary nanocrystal, a weak electron transfer agent, and optionally a solvent; and (b) heating the mixture to a temperature for a period of time sufficient to induce formation of a nanocrystal shell on the primary nanocrystal.

In some preferred embodiments, the mixture comprises at least one coordinating solvent. In some preferred embodiment, the reaction is conducted without including any strong reductant.

In certain embodiments, the method further comprises step (c), cooling or diluting the mixture to stop further growth of the nanocrystal shell. It can further include a step of isolating the core/shell nanocrystal produced by the method. It can further include additional steps of modifying the ligand coating on a shell-covered nanocrystal, including modifying the ligands to produce a water-soluble nanocrystal and optionally cross-linking the ligands on the surface of the nanocrystal.

The components of the shell-forming reaction mixture (i.e., a first precursor, a second precursor, a weak electron transfer agent, a primary nanocrystal, and optionally a solvent) may be added in any order, and the reaction may be heated prior to and/or during addition of one or more of the components of the mixture. The precursors are frequently combined with an appropriate coordinating solvent or mixture of solvents to form a solution for use in methods of the embodiments disclosed herein prior to heating the reaction mixture. The coordinating solvents for the first shell precursor and second shell precursor may be the same or different.

In some embodiments, a mixture comprising at least one coordinating solvent, a first precursor, a second precursor, a weak electron transfer agent, and a primary nanocrystal is formed and the mixture is then heated to a temperature for a period of time sufficient to induce formation of a nanocrystal shell. The reaction mixture does not contain any added strong reducing agents, to minimize any undesired occurrence of nucleation. Frequently, a large excess of the weak reducing agent is used.

In further embodiments, a mixture comprising a first shell precursor, a first solvent and a primary nanocrystal is prepared; a second shell precursor, in a second solvent (which may be the same or different from the first solvent) is added to the first mixture; then a weak electron transfer agent is added in an amount sufficient to promote shell formation, and heating is continued at a temperature and for a time sufficient to induce formation of a nanocrystal shell of a desired thickness. Frequently, a large excess of the weak electron transfer agent is used.

In other embodiments, a mixture comprising at least one coordinating solvent, a first shell precursor, a second shell precursor, and a weak electron transfer agent is heated at a temperature sufficient to promote formation of a nanocrystal shell, then a primary nanocrystal is added to the mixture to provide a site for shell growth, and the reaction mixture is heated further at a temperature and for a time sufficient to provide a desired shell thickness. Frequently, a large excess of the weak electron transfer agent is used. Optionally, more of the electron transfer agent can be added after the reaction has been started.

In some embodiments, the weak electron transfer agent is a chemical reductant selected from the group consisting of tertiary phosphines; secondary phosphines; primary phosphines; amines; hydrazines; hydroxyphenyl compounds; hydrogen; hydrides; metals; boranes; aldehydes; alcohols; thiols; reducing halides; and polyfunctional reductants. Preferably, the weak reductant is one that promotes shell formation but does not cause nucleation of the shell precursors to occur at a rate significantly above the rate of such nucleation when the weak reducing agent is omitted.

In other embodiments, the weak reductant is a cathode. In some such embodiments, the cathode is made of a material selected from the group consisting of platinum, silver, and carbon.

In some embodiments, the weak electron transfer agent is a chemical oxidant selected from the group consisting of potassium nitrate; salts of hypochlorite, chlorite, chlorate, perchlorate and other analogous halogen compounds; tert-butyl hypochlorite; halogens such as fluorine, chlorine, bromine, and iodine; permanganate salts and compounds; cerium ammonium nitrate; hexavalent chromium compounds such as chromic and dichromic acids and chromium trioxide, pyridinium chlorochromate (PCC), and chromate/dichromate compounds; peroxide compounds; Tollens' reagent; sulfoxides; persulfuric acid; oxygen; ozone; osmium tetroxide; nitric acid; nitrous oxide; silver (I) compounds; copper (II) compounds; molybdenum (IV) compounds; iron (III) compounds; manganese (IV) compounds; N-Methylmorpholine-N-Oxide and other N-oxides; trimethylamine N-oxide; 3-chloroperoxybenzoic acid, and other peroxy acids; or peracetic acid. Preferably, the weak oxidant is one that promotes shell formation but does not cause nucleation of the shell precursors to occur at a rate significantly above the rate of such nucleation when the weak oxidizing agent is omitted.

In some embodiments, the coordinating solvent is selected from the group consisting of hydrocarbons, amines, alkyl phosphines, alkyl phosphine oxides, fatty acids, ethers, furans, phospho-acids, pyridines, alkenes, alkynes and mixtures thereof. In some such embodiments, the coordinating solvent comprises a mixture of solvents.

In some embodiments, the first precursor comprises a metal atom, and the second precursor does not contain a metal atom. In specific embodiments, the first precursor contributes a metal cation to core formation when in the heated reaction mixture. In some such embodiments, the first precursor is a salt of Cd or Zn. In specific embodiments, the first precursor is a halide, acetate, carboxylate, phosphonate, or oxide salt form of Cd or Zn.

In some embodiments, the second precursor contributes an uncharged non-metal atom for core formation when it is in the heated reaction mixture. In specific embodiments, the second precursor is a group of the form $R_3P=X$, wherein X is S, Se or Te, and each R is independently H, or a C1-C24 hydrocarbon group. In specific embodiments, the second precursor is tributylphosphine selenide (TBP=Se), trioctylphosphine selenide (TOP=Se), butylphosphine sulfide (TBP=S), trioctylphosphine sulfide (TOP=S), butylphosphine telluride (TBP=Te), or trioctylphosphin)telluride (TOP=Te). Alternatively, the second precursor can be elemental sulfur, tellurium or selenium, such as sulfur dissolved in decylamine, oleylamine, dioctylamine, or octadecene.

In some preferred embodiments, no other precursors are present besides the first precursor and the second precursor. In some preferred embodiments, no strong reductant is present in the shell-forming reaction mixture.

In some embodiments, the methods further comprise a step of cooling the reaction mixture to stop further growth of the nanocrystal shell, or diluting the reaction to stop further growth.

In some embodiments, the methods further comprise a step of monitoring the nanocrystals during the shell-forming reaction to determine when a desired property, such as a desired shell thickness has been achieved. The shell thickness can be monitored by methods known in the art, including monitoring the effect that the shell thickness has on the fluorescence wavelength of the nanocrystal core.

In some embodiments, the methods disclosed herein provide shell-covered nanocrystals without forming any undesired nanocrystals made of only the shell precursors. The nanocrystal products thus preferably contain virtually no nanocrystal consisting of the shell precursors alone. In some embodiments, less than about 1% of the nanocrystals in a batch of nanocrystals produced by the methods of disclosed herein are particles that consist essentially of shell precursors. In other embodiments, less than about 5%, about 4%, about 3%, or about 2%, of the nanocrystals in a batch of nanocrystals produced by the methods disclosed herein are particles that consist essentially of shell precursors. In still other embodiments, less than about 10% to about 20% of the nanocrystals in a batch of nanocrystals produced by the methods disclosed herein are particles that consist essentially of shell precursors.

In some preferred embodiments, the first mixture is maintained at a temperature sufficiently high to promote nucleation during the addition of the weak electron transfer agent. In this way, there is solid surface present to provide a site for growth to occur, which can help reduce the occurrence of undesired nucleation of the shell precursors.

In many embodiments, a large excess of one or more weak electron transfer agents is present in the shell-forming reaction mixture. The excess amount is determined by comparison of the amount of electron transfer agent to the amount of shell precursor that needs to be reduced/oxidized. In some embodiments, a two-fold excess is used. In some embodiments, an excess of at least five equivalents of electron transfer agent relative to shell-forming precursor to be reduced is used. In some embodiments, an excess amount is at least about 10 equivalents of the weak electron transfer agent, or at least about 50 equivalents of the weak electron transfer agent.

The primary nanocrystals can be semiconductive cores made of any suitable metal and non-metal atoms that are known to form semiconductor nanocrystals, as described herein. In particular embodiments, the semiconductive core comprises CdSe, CdS, CdTe, InP or ZnTe, or a mixture thereof. In a specific embodiment, the semiconductive core comprises CdSe or ZnTe.

In preferred embodiments, the first shell precursor and the second shell precursor are mismatched. As described herein, precursors are mismatched when one of the precursors provides a neutral species in solution, and the other precursor provides an ionic species in solution.

In another aspect, the disclosed embodiments provide a nanocrystal produced by one of the methods described herein. The nanocrystal product can be a core/shell nanocrystal, or a core/shell/shell nanocrystal, wherein the first and second shells of the core/shell/shell nanocrystal are different.

In the methods of the embodiments described herein, the heating step(s) is typically conducted at a temperature that is sufficient to induce shell formation at a reasonable rate, which results in the formation of a monodisperse population of core/shell nanocrystals. Typically, the heating step is conducted at a temperature within the range of about 150-350° C., more preferably within the range of about 220-350° C.

It is understood that the above ranges are merely exemplary and are not intended to be limiting in any manner as the actual temperature ranges may vary, dependent upon the relative stability of the reductants, precursors, ligands, and coordinating solvents. Higher or lower temperatures may be appropriate for a particular reaction. The determination of suitable time and temperature conditions for providing nanoparticles is within the level of skill in the art using routine experimentation.

It can be advantageous to conduct the shell-forming reactions described herein with exclusion of oxygen and moisture. In some embodiments the reactions are conducted in an inert atmosphere, such as in a dry box. The solvents and reagents are also typically purified to remove moisture and oxygen and other impurities, and are generally handled and transferred using methods and apparatus designed to minimize exposure to moisture and/or oxygen. In addition, the mixing and heating steps can be conducted in a vessel that is evacuated and filled and/or flushed with an inert gas such as nitrogen. The filling can be periodic or the filling can occur, followed by continuous flushing for a set period of time. Purity of solvents and reagents is sufficient if they achieve the desired shell formation reaction and do not introduce strong electron transfer agents into the reaction.

The solvent for these reactions can comprise an amine, with hexadecylamine as one typical example, and dioctylamine as another suitable example Amine solvents can be difficult to purify sufficiently for use with especially sensitive systems such as for ZnTe nanocrystal core reactions, because of the especially high sensitivity the reaction components and products exhibit toward moisture and air. While nanocrystal preparations are typically done with purified solvents and reagents, and under inert atmosphere, further special precautions and steps can be taken for purifying amine solvents used to prepare ZnTe nanocrystals. That is, the amine to be used as solvent for these reactions is typically rigorously dried using a variety of methods that is known in the art.

Methods of Using the Nanocrystals Provided Herein

Nanocrystals made by these methods can be further modified by modifications of the ligands present on the nanocrystal surface as is known in the art. For example, the ligands on the surface of the nanocrystal can be exchanged for other ligands to introduce new properties such as water solubility to the nanocrystals. Methods for making nanocrystals with water-solubilizing ligand coatings are known in the art. For example, Adams, et al. provides methods to make water-soluble nanocrystals by applying a coating of amphipathic polymeric material to the surface of a hydrophobic nanocrystal. U.S. Pat. No. 6,649,138. The methods start with a hydrophobic nanocrystal, such as one described herein having a coating of hydrophobic ligands, such as trialkyl phosphines, trialkyl phosphine oxides, alkylamines, or alkylphosphonic acids. To this is added an outer layer comprised of a multiply amphipathic dispersant molecule comprising at least two hydrophobic domains and at least two hydrophilic domains. In some embodiments, the amphiphilic polymer comprises an acrylic acid or methacrylic acid polymer having some acrylic acid groups converted into amides with hydrophobic amine groups, such as monoalkyl amines or dialkylamines having at least 4-12 carbons per alkyl group; and having some free carboxylic acid groups to promote water solubility. These and other suitable amphiphilic dispersants suitable for such use are described at columns 14-18 of Adams, which is incorporated herein by reference.

Thus in one aspect, the disclosed embodiments provide a nanocrystal as described herein with a coating of amphiphilic dispersant as described in Adams, et al. The nanocrystals are thereby rendered water-soluble, making them suitable for use in a variety of methods in which nanocrystals such as quantum dots are known to be used. The solubilized nanocrystals and methods of making them are disclosed herein.

Other methods for rendering nanocrystals are described by Naasani, et al., in U.S. Pat. No. 6,955,855 and U.S. Pat. No. 7,198,847. These methods involve coating the nanocrystal with small water-solubilizing ligands, such as imidazole-containing compounds like dipeptides. Suitable imidazole-containing compounds are described at column 7 of the '855 Naasani patent.

By the term "imidazole-containing compound" is meant, for purposes of the specification and claims to refer to a molecule that has at least one imidazole group (e.g., imidazole ring) available for binding a metal such as zinc or other metal cation, or substrate containing such cation. In that part respect, preferably at least one imidazole moiety is in a terminal position with respect to the structure of the molecule. Generally, imidazole ring nitrogens frequently serve as coordinating ligand to operably bind a metal ion such as zinc or cadmium. In one embodiment, the imidazole-containing compound comprises an amino acid, or two or more amino acids joined together (e.g., known in the art as "peptidyl" or "oligopeptide"), which may include, but is not limited to, histidine, carnosine, anserine, baleine, homocarnosine, 1-methylhistidine, 3-methylhistidine, imidazolysine, imidazole-containing ornithine (e.g., 5-methylimidazolone), imidazole-containing alanine (e.g., (beta)-(2-imidazolyl)-L (alpba) alanine), carcinine, histamine, and the like. Imidazole-containing amino acids may be synthesized using methods known in the art (see, e.g., Stankova et al., 1999, J. Peptide Sci. 5:392-398, the disclosure of which is herein incorporated by reference).

By the term "amino acid" is meant, as known in the art and for purposes of the specification and claims, to refer to a compound containing at least one amino group and at least one carboxyl group. As known in the art, an amino group may occur at the position adjacent to a carboxyl group, or may occur at any location along the amino acid molecule. In addition to at least one imidazole moiety, the amino acid may further comprise one or more additional reactive functionalities (e.g., amino, thiol, carboxyl, carboxamide, etc.). The amino acid may be a naturally occurring amino acid, a synthetic amino acid, a modified amino acid, an amino acid derivative, an amino acid precursor, in D (dextro) form, or in L (levo) form. Examples of derivatives may include, but is not limited to, an N-methylated derivative, amide, or ester, as known in the art, and where consistent with the functions of the amino acid as a coating as described herein (e.g., imparts water-solubility, buffers sufficiently in a pH range between about pH 6 and about pH 10, functions as a coat which can increase fluorescence intensity, and has one or more reactive functionalities that may be used to operably bind molecular probe). An amino acid of the aforementioned amino acids may be used in a preferred embodiment, and a preferred amino acid may be used separately in the composition of the disclosed embodiments to the exclusion of amino acids other than the preferred amino acid. Histidine is a particularly preferred imidazole-containing compound for coating the functionalized, fluorescent nanocrystals.

Ligands on the nanocrystals disclosed herein can also be cross-linked to increase the stability of the nanocrystal composition and improve its characteristics. The surface coating of ligands on the nanocrystals disclosed herein can be cross-linked using methods described by Naasani, using various cross-linking agents. Preferred cross-linking agents for use in the disclosed embodiments include those described by Naasani, et al., including tris(hydroxymethyl)phosphine (THP) and tris(hydroxymethyl)phosphino-propionate (THPP). Nanocrystals having water-solubilizing ligand coatings that are cross-linked are thus another embodiment disclosed herein.

Nanocrystals made by these methods can be used in methods for tracking molecules that are known in the art. For example, they can be linked to various target molecules by known methods. Commonly, they are linked to an affinity molecule or used in further transformations. Such further transformations can be used to introduce onto the surface of a nanocrystal a selected target (or cargo) molecule of interest, such as an antibody or other specific affinity molecule. Methods for attaching such affinity molecules to a fluorescent carrier are known in the art and can readily be adapted for use in the present methods: see, e.g., U.S. Pat. No. 6,423,551, which also describes some bi-functional agents that can be used to link the surface of a nanocrystal to a target molecule and to a nanocrystal surface. These methods can also be used to introduce a number of, or a layer of, functionalized molecules on the surface of a nanocrystal, where the functionalized molecules can provide new surface properties to the nanoparticle, such as water-dispersability. In some embodiments, nanocrystals modified for attachment of an affinity molecule that can be used to detect a desired target compound, cell or cellular organelle, are provided.

The modified nanocrystals can be linked to an affinity molecule for use in methods to track, identify, or localize molecules of interest that the affinity molecule can bind to, demonstrating that the molecule of interest is present and where it is distributed or localized. The nanocrystals can also be used in binding experiments to visualize distribution of molecules that the affinity molecule recognizes. Selection of a suitable affinity molecule is within the ordinary level of skill in the art once a target compound is identified; for example, conventional methods can be used to produce or identify an antibody suitable to specifically bind to a target molecule of interest. The antibody can thus be linked to the nanocrystal disclosed herein, which can then be used to identify the presence, location, or movements of the target compound, using the nanocrystal as a fluorescent label. In some embodiments, a method is provided to identify or track a target molecule, by linking a suitable affinity molecule that selectively binds to the target molecule to a nanocrystal and permitting the nanocrystal linked to the affinity molecule to contact the target molecule. Tracking or detection can be achieved by using conventional methods for tracking a fluorescent labeled moiety, such as by use of a fluorescence imaging system, microscope or camera.

In some embodiments, a functionalized nanocrystal as described herein, is provided. The nanocrystal can be linked to an affinity molecule selected to bind specifically to a target molecule of interest. Optionally, the nanocrystal linked to the affinity molecule can be bound to the target molecule of interest to form a fluorescently labeled complex. Target molecules of interest include proteins, enzymes, receptors, nucleic acids, hormones, and cell surface antigens characteristic of specific types of cells.

Other uses, adaptations and variations of the embodiments disclosed herein will be apparent to those skilled in the art from the foregoing description. The following examples are provided as further guidance regarding the making and using of the methods disclosed herein, and are not to be construed as limiting the various embodiments of those methods.

EXAMPLE 1

Formation of ZnTe Core Nanocrystals

All reagents employed were anhydrous and all manipulations were performed under an inert atmosphere, except as noted Zinc chloride (685 mg, 5 mmol) was weighed into a 250 mL round bottom flask with two 14/20 joints and a ground glass stopcock. Dioctylamine (35 mL) and oleic acid (1.6 mL, 5 mmol) were added and the flask was equipped with a magnetic stir bar. The glass stopcock was greased and closed, one glass joint was plugged with a rubber septum, and one joint was equipped with an adaptor and a stainless steel thermocouple, which was connected to a temperature controller modulating a 180 W heating mantle. The flask was placed in the heating mantle and the stopcock was connected to a source of flowing nitrogen and opened. The temperature controller was set to heat the flask to 115° C. and held at that temperature with gentle stirring until the zinc salt dissolved. The flask was then evacuated and refilled with nitrogen three times.

The temperature was subsequently increased to 230° C., whereupon 15 mL of a 1 M solution of tellurium in tributylphosphine was added by syringe through the septum, cooling the flask contents slightly. When the temperature returned to 220° C., 1 mL of a 1 M solution of lithium triethylborohydride in tetrahydrofuran was added rapidly via syringe. The temperature was increased to 240° C. and held for between 15 sec and 30 min, until the desired particle size was reached, then rapidly cooled.

EXAMPLE 2

ZnSe Shell Growth on the ZnTe Nanocrystal

The ZnTe cores are treated as follows to grow a ZnSe shell on the core. ZnTe cores are dispersed in dioctylamine, which has been rigorously dried as described herein.

Zn(oleate)Cl (0.3 equiv.) is added, and the mixture is heated to about 300° C. TOP=Se and Zn(oleate)Cl (about 1 equivalent) is then added, and heating is continued until the desired fluorescent wavelength is reached, indicating that the nanocrystals have reached a desired size. Note that it was shown that the rate of addition of the selenium precursor did not affect the reaction, which is attributed to the rate of reaction being controlled by the rate of reduction, which is limited by the weak reductant's activity. Nanocrystals having a fluorescence maximum between about 520 and 600 nm can be produced, depending upon the size of the ZnTe core and the thickness of the ZnSe shell. The core/shell nanocrystals are isolated by conventional methods. FIG. 2 shows the increase in fluorescence emission as the shell grows on the ZnTe core, and demonstrates that using less than all of the Zn salt in a pretreatment step prior to adding the balance of the shell-forming precursors increases the quantum yield of the product.

EXAMPLE 3

ZnS Shell Growth on InP Nanocrystals

A 0.05 M solution of ionic zinc precursor was prepared by mixing a suitable zinc compound (e.g. zinc acetate, zinc chloride, diethylzinc, etc) with two equivalents of a suitable surfactant (e.g. oleic acid, diisooctylphosphinic acid, etc) in a suitable solvent (e.g. octadecene, hexadecylamine, dioctylamine, trioctylamine, trioctylphosphine, etc) and heating to 250° C., then cooling. A solution of 10-1000 nmol of InP cores in hexane was mixed with a sufficient quantity of the zinc precursor to provide enough zinc ions to deposit a shell of desired thickness (typically 0.5-3 nm). The hexane was removed by evaporation and the mixture was heated to a temperature suitable for shell formation (typically 180-300° C.). Elemental sulfur dissolved in a suitable solvent (e.g. octadecene, oleylamine, decylamine, etc) to a concentration of 0.33 M was added to the heated flask via syringe, either rapidly or over the course of minutes or hours. The product was precipitated by addition of a polar solvent (e.g. methanol, ethanol, acetone, etc), washed with alcohols, and collected in hexane as a solution of core/shell nanocrystals.

EXAMPLE 4

CdS Shell Growth on CdSe Nanocrystals

A 0.46 M solution of ionic cadmium precursor was preparing by mixing a suitable cadmium compound (e.g. cadmium acetate, dimethylcadmium, etc) with two equivalents of a suitable surfactant (e.g. oleic acid, tetradecylphosphonic acid, etc) in a suitable solvent (e.g. octadecene, hexadecylamine, dioctylamine, trioctylamine, trioctylphosphine, etc) and heating to 250° C., then cooling. A second flask was loaded with 10-1000 nmol of CdSe cores, approximately 20000 equivalents of the surfactant, and sufficient solvent to dilute the cores to a concentration of approximately 50 nM. The second flask was heating to a temperature suitable for shell formation (typically 180-300° C.). The cadmium precursor and elemental sulfur dissolved in a suitable solvent (e.g. octadecene, oleylamine, decylamine, etc) to a concentration of 0.33 M were added to the heated flask via syringe, either rapidly or over the course of minutes or hours. The product was either used without purification or precipitated by addition of a polar solvent (e.g. methanol, ethanol, acetone, etc), washed with alcohols, and collected in hexane as a solution of core/shell nanocrystals.

EXAMPLE 5

ZnS Shell Growth on CdS/CdSe Core/Shell Nanocrystals

A 0.46 M solution of ionic zinc precursor was preparing by mixing a suitable cadmium compound (e.g. zinc acetate, zinc chloride, diethylzinc, etc) with two equivalents of a suitable surfactant (e.g. oleic acid, diisooctylphosphinic acid, etc) in a suitable solvent (e.g. octadecene, hexadecylamine, dioctylamine, trioctylamine, trioctylphosphine, etc) and heating to 250° C., then cooling. A second flask was loaded with 10-1000 nmol of CdSe/CdS core/shells, approximately 20000 equivalents of the surfactant, and sufficient solvent to dilute the cores to a concentration of approximately 50 nM. The second flask was heating to a temperature suitable for shell formation (typically 180-300° C.). The zinc precursor and elemental sulfur dissolved in a suitable solvent (e.g. octadecene, oleylamine, decylamine, etc) to a concentration of 0.33 M were added to the heated flask via syringe, either rapidly or over the course of minutes or hours. The product was precipitated by addition of a polar solvent (e.g. methanol, ethanol, acetone, etc), washed with alcohols, and collected in hexane as a solution of core/shell nanocrystals.

EXAMPLE 6

ZnS Shell Growth on InP Nanocrystals in a Continuous Flow System

A ZnS shell was applied to an InP nanocrystal core in a continuous flow reactor system, as described in the following method. The method included several unsaturated materials, including solvents (ODE) and other reagents (oleylamine, zinc oleate). It was found that using conventional continuous flow methods, these materials became clogged in the reactor. While not bound by theory, it is thought reactor clogging may be in part due to the polymerization of unsaturated components at elevated temperatures.

Flow shell synthesis reactions are provided that attempt to eliminate all unsaturated double bonds in the precursors and solvents. The solvent was changed to squalane, which is a fully saturated branched hydrocarbon with a high boiling point and a low freezing point. This solvent works equivalently to 1-octadecene (ODE) in batch mode. The sulfur precursor used previously was elemental sulfur dispersed in oleylamine (contains one double bond). Oleylamine was replaced with elemental sulfur dispersed in decylamine. This worked surprisingly well and made a red solution which was a liquid at room temperature. The zinc precursor was previously zinc oleate in ODE. This was replaced by zinc stearate in squalane. To use this precursor, it required pre-heating to above 100° C. to keep the solvent and precursor melt mixed.

InP cores in squalane, and sulfur and zinc precursors in saturated compositions as described above were loaded into three syringes and mounted on three separately controlled syringe pumps. First, just the core syringe was run through the reactor at 300° C. to test whether clogging would be an issue. For 45 minutes at 300° C., no clogging was observed. Next, zinc precursor plus cores were run. In batch mode, mixing cores and zinc precursors and heating them together results in InP core blue shift. After waiting 15 minutes (residence time) the cores started to blue shift as expected.

Lastly, the sulfur precursor was started. After 15 minutes, the cores red shifted and became luminescent, indicating that a ZnS shell was being formed on the InP nanocrystal cores. Samples were collected over a period of 2 hours of continuous output, where conditions were changed to prepare core shells of different emission wavelengths. InP/ZnS core/shell nanocrystals with four colors ranging from blue to orange were produced by continuous flow synthesis. The colors were visualized under 365 nm UV excitation.

What is claimed is:

1. A method for forming shells on a population of nanocrystals, comprising:
    forming a reaction mixture comprising a plurality of core nanocrystals, a first semiconductor shell precursor, a second semiconductor shell precursor, a weak reducing agent comprising an unsaturated hydrocarbon group, wherein the hydrocarbon group is linked to a carboxylate group, and optionally a coordinating solvent, wherein the first shell precursor and the second shell precursor have different oxidation states, wherein the second shell precursor is elemental sulfur, selenium or tellurium, or $R_3P=X$, wherein X is S, Se or Te, and each R is independently H or a $C_1$-$C_{24}$ hydrocarbon group, and the reaction mixture is substantially free of a strong reducing agent, wherein the strong reducing agent is one that induces nucleation of the shell precursors in the absence of the nanocrystal core under the conditions of the shell-forming reaction, wherein the reaction mixture is formed in the absence of heating; and
    heating the reaction mixture to a temperature high enough to induce formation of a shell on each of the plurality of core nanocrystals, whereby the oxidation state of the first shell precursor or the second shell precursor are changed using the weak reducing agent such that the first shell precursor and the second shell precursor can react to form a semiconductor shell around each of the plurality of core nanocrystals, wherein the shell is different from the core, wherein the number of nanocrystals composed of just shell precursors is less than 5% of the population of nanocrystals.

2. The method for forming shells on a population of nanocrystals, as recited in claim 1, wherein the shell formation reaction occurs in a batch reactor system.

3. The method for forming shells on a population of nanocrystals, as recited in claim 1, wherein the shell formation reaction occurs in a continuous flow reactor system.

4. The method for forming shells on a population of nanocrystals, as recited in claim 1, wherein the oxidation states of the first shell precursor or the second shell precursor is changed to a neutral state by the weak reducing agent.

5. The method for forming shells on a population of nanocrystals, as recited in claim 1, wherein the oxidation states of the first shell precursor and the second shell precursor are matched by the weak reducing agent.

6. The method for forming shells on a population of nanocrystals, as recited in claim 1, wherein the first shell precursor is a zinc salt or a cadmium salt.

7. The method for forming shells on a population of nanocrystals, as recited in claim 1, wherein the second shell precursor is selected from $S^0$, $Se^0$, $Te^0$, $R_3P=S$, $R_3P=Se$, and $R_3P=Te$, wherein each R is independently H, or a $C_1$-$C_{24}$ hydrocarbon group.

8. The method for forming shells on a population of nanocrystals, as recited in claim 1, wherein the weak reducing agent is one that does not induce nucleation of the shell precursors in the absence of the nanocrystal under the conditions of the shell-forming reaction.

9. The method for forming shells on a population of nanocrystals, as recited in claim 1, wherein the shell precursors are added as quickly as temperature control will permit, avoiding the need for slow addition of at least one precursor to reduce nucleation.

10. The method for forming shells on a population of nanocrystals, as recited in claim 1, wherein the first shell precursor and the second shell precursor do not form a shell around each of the plurality of nanocrystals under the same reaction conditions when the weak electron transfer agent is omitted.

11. The method for forming shells on a population of nanocrystals, as recited in claim 1, wherein an excess of the weak reducing agent is present in the reaction mixture.

12. The method for forming shells on a population of nanocrystals, as recited in claim 1, wherein shell formation occurs at least about 50% faster in the presence of the weak reducing agent than it would in the absence of the weak reducing agent.

13. The method for forming shells on a population of nanocrystals, as recited in claim 1, wherein the first shell precursor is a carboxylic acid salt or a phosphonic acid salt of Cd or Zn.

14. The method for forming shells on a population of nanocrystals, as recited in claim 13, wherein the salt of Cd or Zn is a salt of the form $M(O_2CR)X$, wherein M is Cd or Zn; X is a halide or $O_2CR$; and R is a $C_4$-$C_{24}$ alkyl group that is optionally unsaturated.

15. The method for forming shells on a population of nanocrystals, as recited in claim 1, wherein the nanocrystal core is selected from the group consisting of CdSe, CdS, CdTe, ZnTe, ZnSe, ZnS, InP, InAs and GaP.

16. The method for forming shells on a population of nanocrystals, as recited in claim 1, wherein the semiconductor shell is selected from the group consisting of ZnS, ZnSe, ZnTe, CdSe, CdTe and CdS.

17. The method for forming shells on a population of nanocrystals, as recited in claim 1, wherein the solvent comprises an alkylamine of formula R—$NH_2$, a dialkylamine of formula $R_2NH$, an alkane, or an alkene, and optionally further comprises a phosphine oxide of the formula $R_3P=O$, wherein each R is independently a $C_4$-$C_{24}$ alkyl group that is optionally unsaturated.

18. The method of claim 1, wherein the reaction mixture is heated to a temperature high enough to change the oxidation state of the first shell precursor or the second shell precursor such that the first shell precursor and the second shell precursor can react to form a shell around each of the plurality of nanocrystals.

* * * * *